(12) United States Patent
Massicotte

(10) Patent No.: US 10,862,880 B1
(45) Date of Patent: Dec. 8, 2020

(54) AUTHENTICATION SECURITY VIA APPLICATION-SPECIFIC DYNAMIC TOKEN GENERATION

(71) Applicant: Twitter, Inc., San Francisco, CA (US)

(72) Inventor: Matthew William Massicotte, Cambridge, MA (US)

(73) Assignee: Twitter, Inc., San Francisco, CA (US)

( * ) Notice: Subject to any disclaimer, the term of this patent is extended or adjusted under 35 U.S.C. 154(b) by 183 days.

(21) Appl. No.: 15/587,653

(22) Filed: May 5, 2017

Related U.S. Application Data

(60) Provisional application No. 62/332,108, filed on May 5, 2016.

(51) Int. Cl.
*H04L 29/06* (2006.01)

(52) U.S. Cl.
CPC .......... *H04L 63/083* (2013.01); *H04L 63/062* (2013.01)

(58) Field of Classification Search
CPC ........................... H04L 63/083; H04L 63/062
USPC .................................................. 726/6, 7, 9
See application file for complete search history.

(56) References Cited

U.S. PATENT DOCUMENTS

| | | | |
|---|---|---|---|
| 9,208,284 B1 * | 12/2015 | Douglass | G06F 19/00 |
| 9,414,348 B2 * | 8/2016 | Saari | H04W 64/00 |
| 10,499,811 B2 * | 12/2019 | Mensinger | A61B 5/742 |
| 2004/0221032 A1 * | 11/2004 | Bernstein | H04L 41/0896 709/224 |
| 2014/0040139 A1 * | 2/2014 | Brudnicki | G06Q 20/227 705/44 |
| 2015/0205755 A1 * | 7/2015 | Gilbert | H04L 9/083 726/9 |
| 2015/0326578 A1 * | 11/2015 | Hsu | H04L 63/10 726/9 |
| 2016/0134660 A1 * | 5/2016 | Ponsini | H04L 9/3234 726/1 |

* cited by examiner

*Primary Examiner* — Jahangir Kabir
(74) *Attorney, Agent, or Firm* — Fish & Richardson P.C.

(57) ABSTRACT

This description relates to techniques for authenticating an application through generation of a dynamic application-specific token. A client application executing on a client device receives a request from a server for a token. The client application accesses a resource file or portion thereof that is accessible to both the client application and authenticator and is known to be accessible to the client application by the authenticator in response to the request for the token and extracts a copy of the resource file or the portion. A token is generated based on the extracted copy and additional information factors if any, some of which may be random or pseudo-random. The token is transmitted to the server for authentication.

33 Claims, 16 Drawing Sheets

600

AUTHENTICATION SECURITY VIA APPLICATION-SPECIFIC DYNAMIC TOKEN GENERATION

CROSS REFERENCE TO RELATED APPLICATIONS

This application claims the benefit of U.S. Provisional Application No. 62/332,108, filed May 5, 2016, which is incorporated by reference in its entirety.

BACKGROUND

This disclosure relates generally to software authentication technology, and specifically to authentication security using dynamic tokens. An authentication process can be used to establish the identity of a particular application. Conventionally, authentication is carried out using a piece of digital information—hereafter referred to as a token—that is requested from one computing device by another computing device or application. A client application—for example, a mobile app—receives an authentication request from a server and responds to it with an authentication token. The token is verified and the server establishes the identity of the client application. This technique is widely implemented across the Internet due to its ease of implementation.

Unfortunately, this authentication process described above is relatively weak and can be easily circumvented. Authentication tokens are usually small, and thus are easily transferred, stolen, or copied by malicious actors. Tokens commonly in use by a variety of popular Internet services, including the most commonly used social media services, are available online. Any attacker who obtains an authentication token may gain access to back-end services of a system using a counterfeit or illegitimate application. This poses a serious security risk for the application, data, and information assessable by via the token. Accordingly, an improved authentication process is desirable.

SUMMARY

Figure 1:
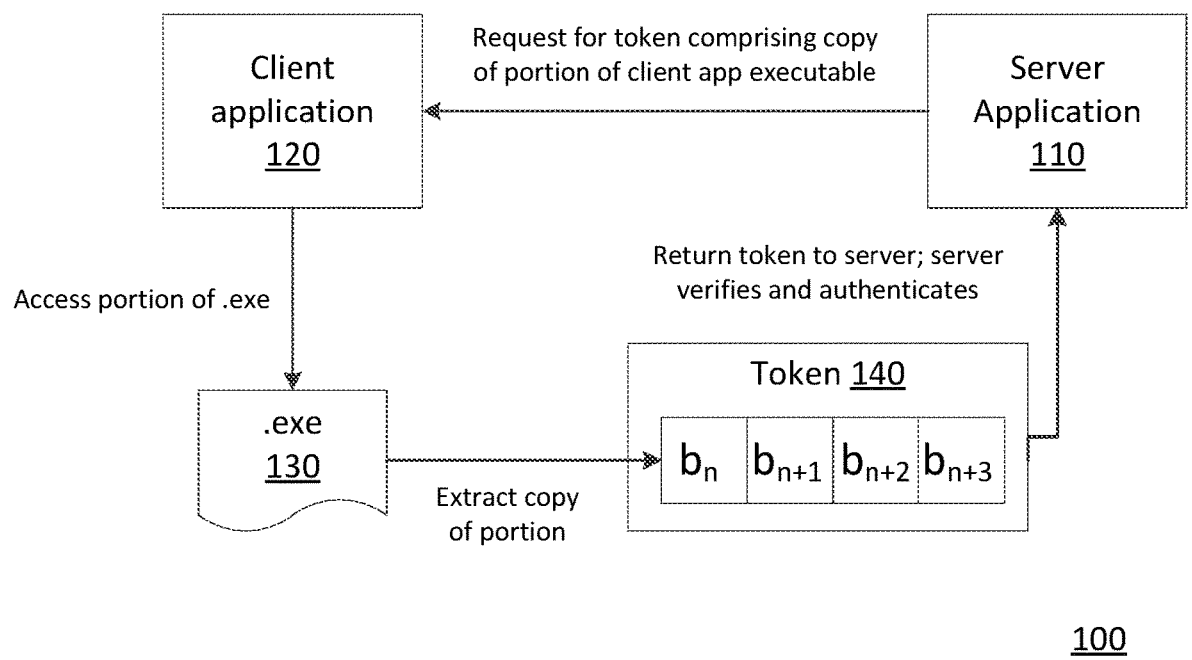
FIG. 1 is a block diagram illustrating an example method of authentication using a token comprising a portion of a client application executable, according to one embodiment.

Authentication security for client applications is improved via the use of dynamic application-specific authentication tokens. Tokens are generated based on resources that are (i) accessible to the application when it is executing on the client device, (ii) accessible to the authenticator (e.g., a server doing the authenticating), and (iii) that the authenticator is aware that that said resources are available to the application and/or client device. Such resources can include, but are not limited to, any resource provided as part of or in association with a client application, which itself may include but is not limited to executable code, translation string files, icons, other graphics, sounds files, etc. This can also include resources (and information more generally) that the authenticator has access to and which the authenticator knows are accessible to the client device on which the application is executing, which include but are not limited to system resources, for example, which themselves are not part of the client application per se.

Generation of tokens may also be based on additional information factors that may be known to both parties but which are not exchanged with the token, such as the time of day the token is generated, the date the token is generated, the run-time environment or other specific resources used to generate the token, etc. Generation of tokens may also be based on random or pseudorandom factors known to both the application and the authenticator, such as code that randomly selects which resource or part thereof is used for authentication, for example based on selection from a list of resources or their portions, selection from lines of code within the resources, selection from types of resources that are used, and so on. Which of these random or pseudorandom factors are used may be determined based on the time, time of day, day of week (e.g., odd or even days) or some other non-time metric known to both the application and the authenticator, such as odd or even authentication attempts, running count of authentications performed, and so on.

Regardless of specifically how the token is generated, tokens that are generated in a manner consistent with this description are sufficiently large in size (e.g., as measured by the amount of bytes taken up by the token in storage) so as to make hacking a computationally intensive process.

A client application receives a request from a server for an authentication token. The client application accesses a portion of its executable code and copies a specified portion. The client application may perform additional processing steps or computations, such as obfuscation or encryption. The client application transmits the token to the server, which verifies the token and authenticates the client application.

Conventional authentication tokens are relatively easily stolen or reproduced, allowing malicious actors to access protected information with little to no effort. Authentication tokens generated based on a combination of executable code and other information factors (which may be random or pseudo-random) increase the computational burden, thereby improving the security of client applications and protected resources.

DETAILED DESCRIPTION

Configuration Overview

The disclosed configurations include systems (and corresponding methods and processes) and computer readable storage media storing instructions executable by one or more processors for performing authentication, for example, of an application, data, or other information.

The disclosed system improves authentication security using application-specific dynamically generated tokens. By way of example, authentication is performed by exchanging authentication tokens based on resources that are (i) accessible to the application when it is executing on the client device, (ii) accessible to the authenticator (e.g., a server doing the authenticating), and (iii) that the authenticator is aware that that said resources are available to the application and/or client device. Such resources can include, but are not limited to, any resource provided as part of or in association with a client application, which itself may include but is not limited to executable code, translation string files, icons, other graphics, sounds files, etc. This can also include resources (and information more generally) that the authenticator has access to and which the authenticator knows are accessible to the client device on which the application is executing, which include but are not limited to system resources, for example, which themselves are not part of the client application per se. The authenticator may have knowledge of what non-application resources are available to the application or client device on the basis of the operating system running on the client device, the version of the operating system, or other identifying or cataloging information or processes passed back to the authenticator identifying the non-application resources available on the client device.

In a typical embodiment, the portion of the resource selected for use is large enough (e.g., 1 MB or greater) to impose a significant computational burden.

Additional embodiments involve further computations that leverage other factors that may be known to both parties but which are not exchanged with the token. These factors may include, for example, representations of the run-time environment state of the client application, a state variable computed during a previous authentication iteration, the time of day the token is generated, the date the token is generated, or other similar time related factors. Other potential information factors suitable for inclusion in the token include random or pseudo-random processes involving mathematical properties of the client application, such as the presence of prime numbers in various system parameters. These information factors may even cause the client application to select a different resources or portions thereof for different authentication attempts Generation of tokens may also be based on random or pseudorandom factors known to both the application and the authenticator, such as code that randomly selects which resource or part thereof is used for authentication, for example based on selection from a list of resources or their portions, selection from particular lines of code within the resources, selection from types of resources that are used, and so on. Which of these random or pseudorandom factors (often implemented as algorithms as part of the application authentication code) are used may be determined based on the time, time of day, day of week (e.g., odd or even days) or some other non-time metric known to both the application and the authenticator, such as odd or even authentication attempts, running count of authentications performed, other persistent application state variables, and so on.

These additional information factors result in tokens that are unpredictable or difficult to reproduce. Overall, the disclosed configurations are intended to increase the computational burden on a malicious actor who wishes to gain illegitimate access to protected application data, resources, or other information.

Example Authentication Process

Figure (FIG. 1 it illustrates an example embodiment of the authentication process involving application-specific dynamically-generated tokens. An environment 100 for this process includes a server application 110, a client application 120, an executable code 130, and a token 140. The server application 110 executes on a server computing system and the client application 120 executes on a client computing system. An example of a computing architecture of a server computing system or a client computing system is further described with FIG. 16 below. In one embodiment client application 120 requests a particular resource from the server application 110. The server application 110 transmits to the client application 120 a request for an authentication token.

In this example embodiment, the request specifies a particular portion of the client application executable that will serve as the basis for generation of an authentication token. In other embodiments, rather than using a portion of the executable code, other resource files associated with the client application can be used to generate the token, examples of which but are not limited to executable code, translation string files, icons, other graphics, sounds files, etc.

However, as above recall that to generate the token any resources may be used that that are (i) accessible to the application when it is executing on the client device, (ii) accessible to the authenticator (e.g., a server doing the authenticating), and (iii) that the authenticator is aware that that said resources are available to the application and/or client device. Generation of tokens may also be based on additional information factors and/or pseudorandom factors as introduced above.

Regardless of specifically how the token is generated, tokens that are generated in an embodiment consistent with this description are sufficiently large in size (e.g., as measured by the amount of bytes taken up by the token in storage) so as to make hacking a computationally intensive process. In one embodiment, the token is greater than one megabyte in size, as an example. Larger tokens are also contemplated, as are smaller tokens as long as they are sufficiently large as to make hacking computationally intensive.

In more detail, the server may select the resource or a portion of the resource in one of multiple ways. In one embodiment, the portion is selected according to a regular or repeating pattern. In another embodiment, the server employs a pseudorandom process that takes into account the current time and date. For example, the server application 110 may ask the client application 120 to provide one portion of the executable if a certain numerical parameter (such as the number of processor threads) is prime, and another portion if it is not prime. The server may also rely on other unpredictable factors such as its own memory utilization or particular details of its current run-time state. The requested portion of the executable code is unknown to the client application 120 prior to receipt of the request. Upon receipt of the request, the client application 120 accesses the executable code and extracts a copy of the specified portion of the executable code 130 of the client application 120.

In this example, the extracted copy of the executable code 130 is used as a basis to generate a token 140. The client application 120 transmits to the server application 110 the token 140 containing this extracted portion of the executable code 130. The server application 110 receives the token 140 and verifies the executable portion contained therein with the original request. Upon successful verification, the server application 110 authenticates the client application to complete the authentication process. The method described above can be used to ensure that each token is not only unique but is computationally difficult to replicate. The result is that attackers and malicious actors must expend significantly more time and computing resources to successfully authenticate their illegitimate application or gain access to protected resources.

Figure 2:
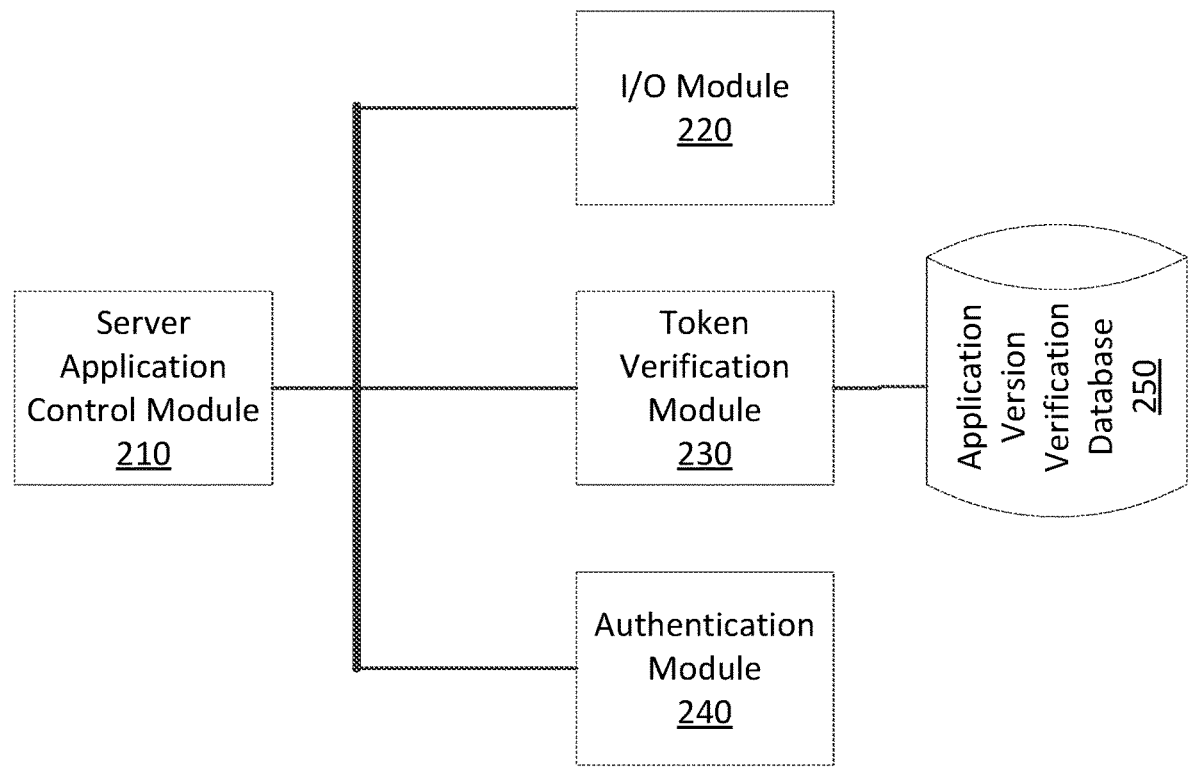
FIG. 2 is a diagram of an example server application.

Turning to FIG. 2, it illustrates an environment 200 of a server application 120 executing on a server computing system. The environment 200 contains a server application control module 210, an I/O (input-output) module 220, a token verification module 230, an authentication module 240, and an application version verification database 250. The server application control module 210 is configured to manage the operation of the other modules 220, 230, 240. The I/O module 220 is configured to communicate with a client application 110. Specifically, the I/O module 220 transmits requests for tokens and receives tokens from the client application 110.

The token verification module 230 is configured to access the application version verification database 250. The application verification database 250 contains version-specific and application-specific information of the client application 120 executing on a client computing device. The stored application information also may include pre-verified results of computations associated with the stored application information as is further described below. By maintaining information on specific applications, including version and/or release information associated with that application and/or computations involving them, the server application 110 is able to request specific information from a particular client application, e.g., 120 and thereafter confirm that token received back is a match to precisely what was requested. This allows for verification of tokens received from client applications 120. The authentication module 240 is configured to complete the authentication process upon successful verification by the token verification module.

Figure 3:
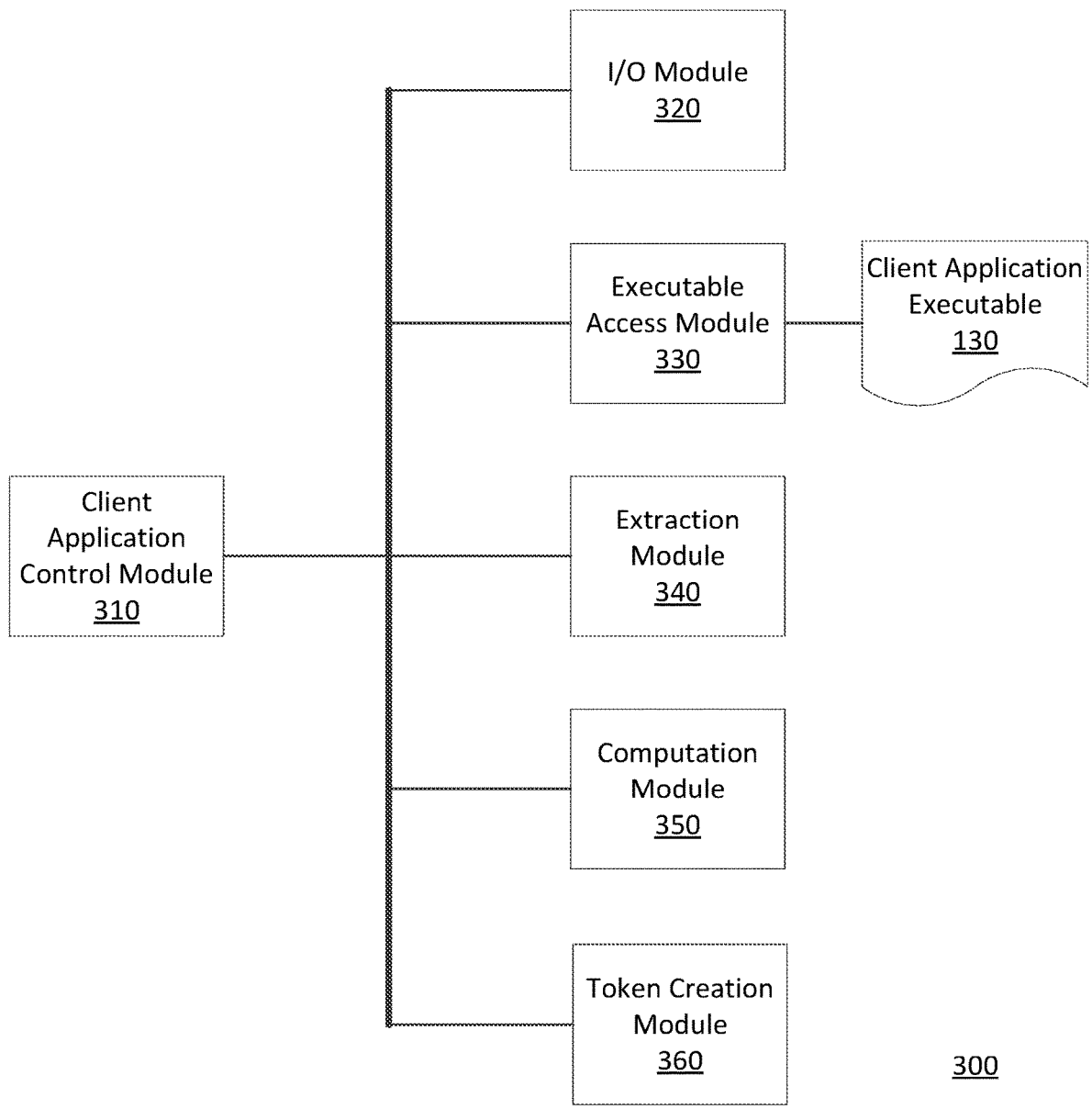
FIG. 3 is a diagram of an example client application.

Referring now to FIG. 3, illustrated is an environment 300 of the client application 120. The client application 120 includes a client application control module 310, an I/O module 320, an executable access module 330, an extraction module 340, a computation module 350, a token creation module 360, and a client application executable 370. The client application control module 310 and I/O module 320 are analogous to the server application control module 210 and I/O module 220 featured in an environment 200 of the server application in FIG. 2.

In FIG. 3 the executable access module 330 is configured to access (i.e., read from) the client application executable 130. The extraction module 340 is communicatively coupled with the executable access module 330. The extraction module 340 interacts with the executable access module 330 to extract a copy of the portion of the client application executable 130 as specified by the request received from the server application 110. The computation module 350 is configured to perform any computations on the extracted copy of the portion of the client application executable 130. The token creation module 360 is configured to produce a token, as discussed in the remainder of this document. Again, in this example the token is produced is based on a portion of the client executable 130. When a server application 110 transmits a request for a token to the client application 120, this request is received by the I/O module 320. Upon receipt of this request, the client application control module 310 directs the executable access module 330 to access the client application executable 130. Subsequently, the extraction module 340 extracts the resources needed to create the token, such as a copy of the specified portion of the executable 130. Finally, the token creation module 360 creates a token. The token is transmitted to the server application 110 by the I/O module 320.

Figure 4:
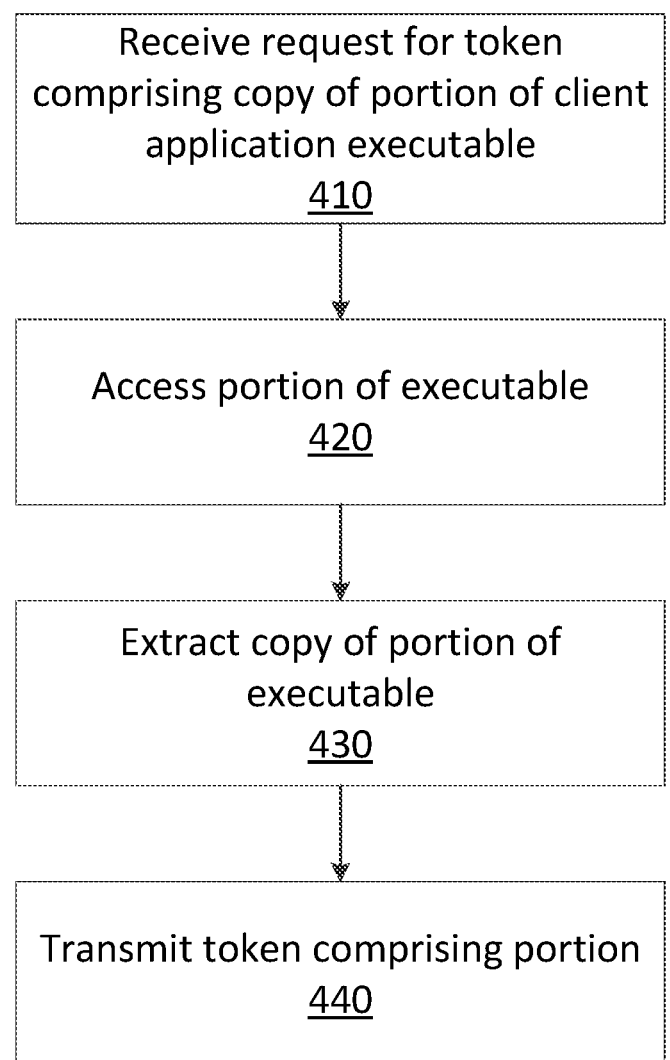
FIG. 4 is a flowchart illustrating an example method of authentication using a token comprising a portion of a client application executable from the perspective of the client application, according to one embodiment.

Next, FIG. 4 is a flowchart illustrating an example method for authentication via application-specific dynamic token generation from the perspective of a client application, according to one example embodiment. In this example, the client application receives 410 a request for a token from a server application 110. The request, as stated previously, specifies the resource or portion thereof to be returned by the client application 120. In response to the request, the client application 120 accesses 420 the specified resource or portion thereof. Next, the client application 120 extracts 430 the copy of the specified resource or portion thereof, the copy comprising the token 140. Finally, the client application transmits 440 the token 140 to the requesting server application 110.

Figure 5:
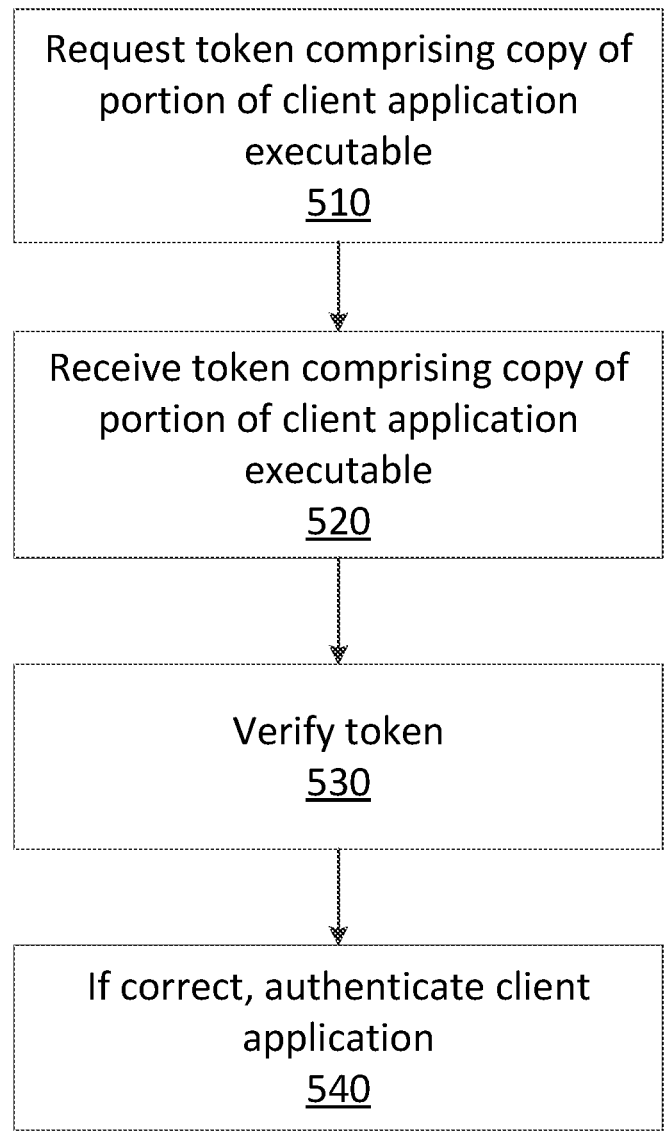
FIG. 5 is a flowchart illustrating the example method of authentication using a token comprising a portion of a client application executable from the perspective of a server application, according to one embodiment.

The above example method is illustrated again in FIG. 5, this time from the perspective of a server application 110. The server application 110 requests 510 a token specifying a desired portion of the client application executable, as described previously. Subsequently, the server application 110 receives the token 140 comprising a copy of the requested portion of the client application executable. It then verifies the received token 140. As described previously, in one embodiment the server application 110 may access an application-specific verification database, e.g. 250, which stores all verification information associated with a particular token request. The database 250 may include, for example, multiple portions of the client application executable 130 corresponding to each version of a client application 120. Each portion may be stored in the database 250 along with an identifier specifying a corresponding token request. Upon receipt of a token from a client application 120, the server application control module 210 may direct the token verification module 230 to access the application version verification database 250 and retrieve a portion of the client application executable 130 based on its associated identifier. The token verification module 230 may then compare the portion of the client application executable 130 contained in the token with the portion retrieved from the database 250. If the portions match, the server application control module 210 may direct the authentication module 240 to authenticate the client application 120.

Token Generation Based on Computations

According to another example embodiment, a client application, e.g., 120, may transmit a token, e.g., 140, comprising a computation based on a resource or portion thereof of the client application executable code, e.g., 130, or any other resource introduced in the prior sections of this description. As described previously, the motivation for performing one or more computations on the executable code is to increase the effort required for a malicious actor to gain illegitimate access to the resources provided by a server. Some examples of computations which may be performed on a portion of the client application executable include hash functions, which map digital information of any size to digital information of a fixed size. In particular, one particular class of hash function—a cryptographic hash function—may be utilized. These functions are especially useful because the output of a cryptographic hash function cannot be readily analyzed to determine the input. In a typical embodiment, a portion of executable code is inputted into a cryptographic hash function. The function's output is then returned in the token 140 to the server 110. This method improves the security of authentication in multiple ways. For example, it is very difficult for a malicious actor to determine the source of the authentication information—i.e., the portion of executable code that was inputted into the cryptographic hash function. In addition, even if the input is identified, a malicious actor would then have to perform the same computation(s) to produce the requested token, which is a costly and resource-intensive process.

Figure 6:
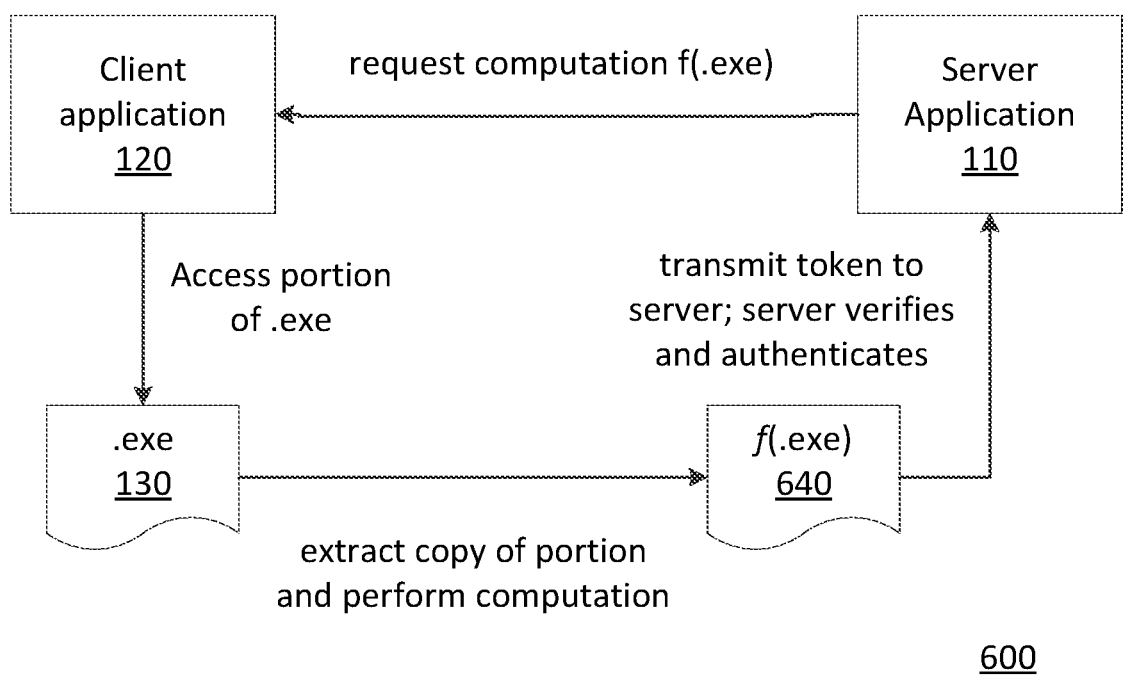
FIG. 6 is a block diagram illustrating an example method of authentication using a token comprising a computation based on a portion of a client application executable, according to one embodiment.

FIG. 6 illustrates a method of token generation using a computation based on a portion of executable code, according to one embodiment. The method in this example is in an environment 600 that includes a server application 110, a client application 120, a client application executable 130, and a computation result f(.exe) 640. The server application 110 first requests from the client application 120 a token. The server application 110 specifies the computation to be performed and the resource or portion thereof which should be used as input. Referring now back to FIG. 3, this request is received by the I/O module 320 of the client application 120. The client application executable is accessed and a portion is extracted as is described in previous embodiments. Using this extracted portion, the computation module 350 performs the specified computation. Returning to FIG. 6, the computation result 640, f(.exe), is transmitted in a token to the server application 110. The server application 110 receives the token and verifies it. Upon successful verification, the server application 110 authenticates the client application 120.

Figure 7:
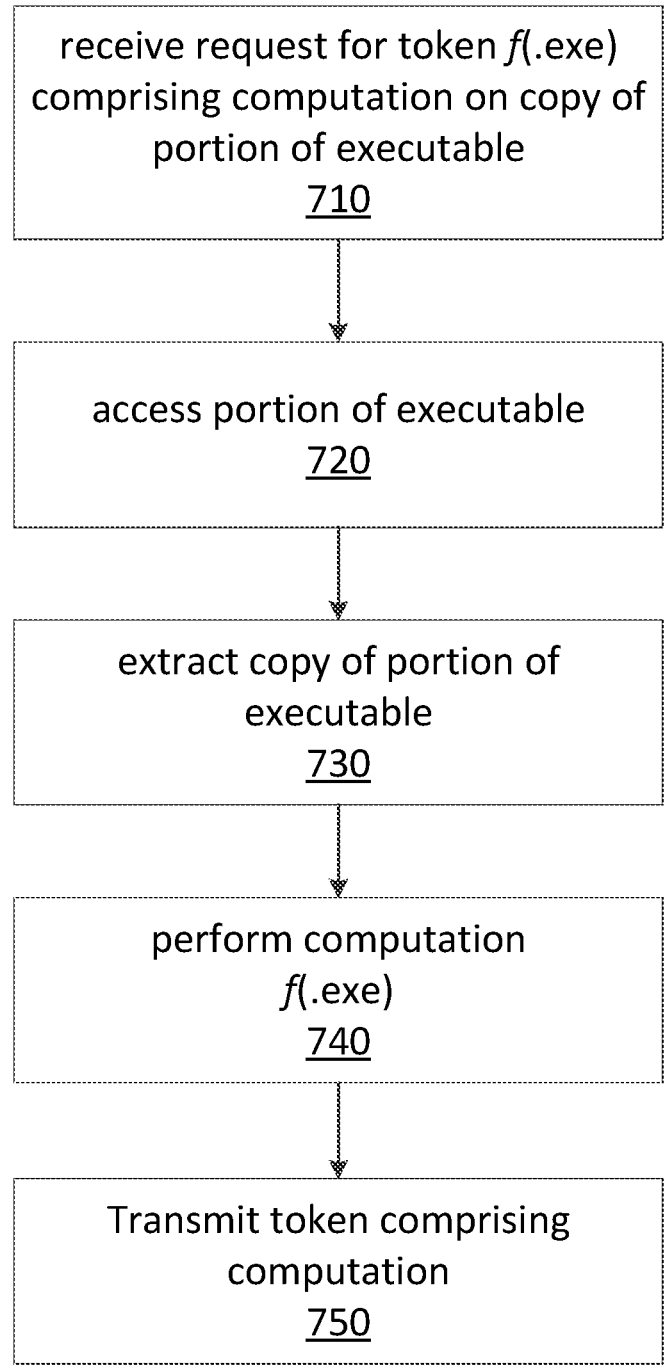
FIG. 7 is a flowchart illustrating the example method of authentication using a token comprising a computation based on a portion of a client application executable, according to one embodiment.

FIG. 7 is a flowchart further illustrating this method for authentication based on computations according to the embodiment described previously (using a portion of the executable to generate the token) from the perspective of the client application 120. The client application 120 receives 710 a request for a token, the request specifying a particular computation f(.exe) to be performed on a portion of the client application executable. In response to this request, the client application 120 accesses 720 the specified portion of the client application executable 130. It then extracts 730 a copy of the portion. Next, the client application 120 performs 740 the specified computation, producing a computation result f(.exe). This computation result is transmitted 750 in a token by the client application 120 to the server application 110.

Figure 8:
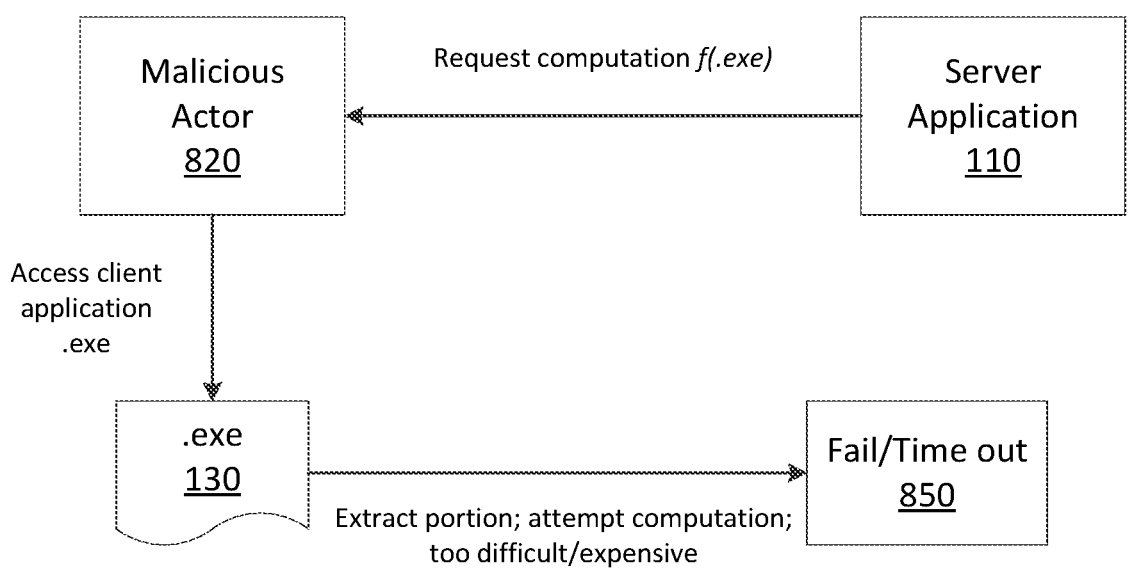
FIG. 8 is a block diagram illustrating an example method of denying authentication to a malicious actor using a token comprised of a computation based on a portion of a client application executable, according to one embodiment.

The method described above is designed to make the authentication process more difficult for a malicious actor to perform successfully. FIG. 8 illustrates an intended outcome for a malicious actor attempting to perform the same steps. An environment 800 of the figure contains the server application 110, a malicious actor 820, the client application executable 130, and an abstracted terminal fail/time out state 850. The server application 810 first requests a token from the malicious actor 820. The server application 810 specifies the computation to be performed and the portion of the client application executable 830 which should be used as input. In this situation it is assumed that the malicious actor 820 has access to the client application executable 130 of a legitimate client application 110. This example assumption is based on the executable code associated with a client application being compiled and transferred in some manner. Upon receipt of this request, the malicious actor 820 accesses the specified portion of the client application executable 130. It extracts a copy of the portion, and attempts to perform the specified computation. However, due to the difficulty of the computation, or because computing resources are insufficient, the malicious actor 820 is unable to perform the computation. The authentication process is terminated, resulting in the terminal fail/time out state 850. It is noted that the termination can be based on a different factors, for example, the malicious actor 820 gives up and exits the process, the application rejects further attempts to access after a predefined number of unsuccessful attempts, or immediately upon a first attempt based on prior information that may suggest an unauthorized access event may occur.

Figure 9:
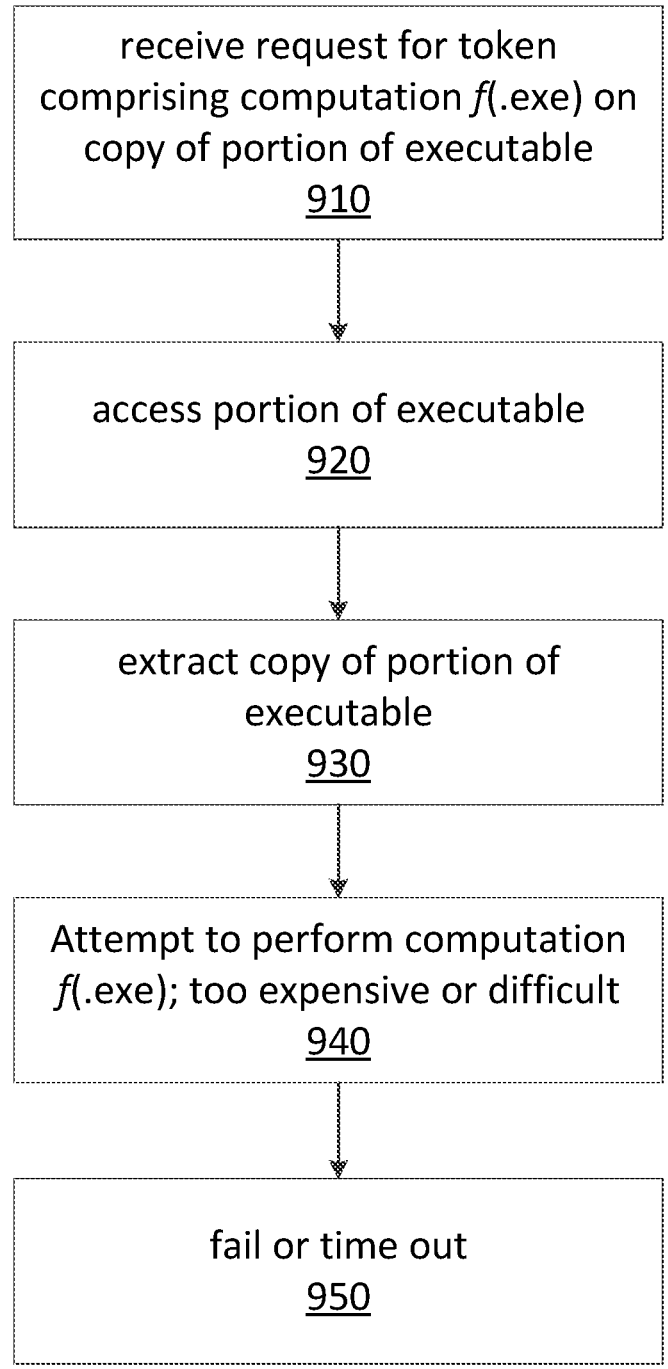
FIG. 9 is a flowchart illustrating an example method of denying authentication to a malicious actor using a token comprised of a computation based on a portion of a client application executable, according to one embodiment.

FIG. 9 is a flowchart illustrating an example of how an unsuccessful authentication attempt is addressed according to the above example embodiment. The malicious actor 820 receives 910 a request for a token, the request specifying a computation f(.exe) to be performed on a specified portion of the client application executable 130. Upon receipt of this request, the malicious actor 820 accesses 920 the specified portion of the client application executable 130. The malicious actor 820 extracts 930 a copy of the portion. The malicious actor 820 attempts 940 to perform the requested computation; however, the computation is too difficult or expensive (in terms of computing time or resources). Unable to perform the computation, the authentication process fails or times out 950 and is terminated.

Token Generation Based on Run-Time Environment States

A common type of attack involves the creation of multiple instances of an illegitimate client application, e.g. 120, by a malicious actor, e.g., 820. Using these multiple instances, the malicious actor 820 spams a server application, e.g. 110, with repeated requests for a particular resource. This degrades the performance of the server application 110 and reduces service quality for other legitimate applications.

In another embodiment, the difficulty of mounting an attack similar to the one described above is greatly increased by incorporating a representation of a run-time environment of a client application into dynamically-generated tokens, in addition to using computations based on a client application executable, e.g. 130.

Figure 10:
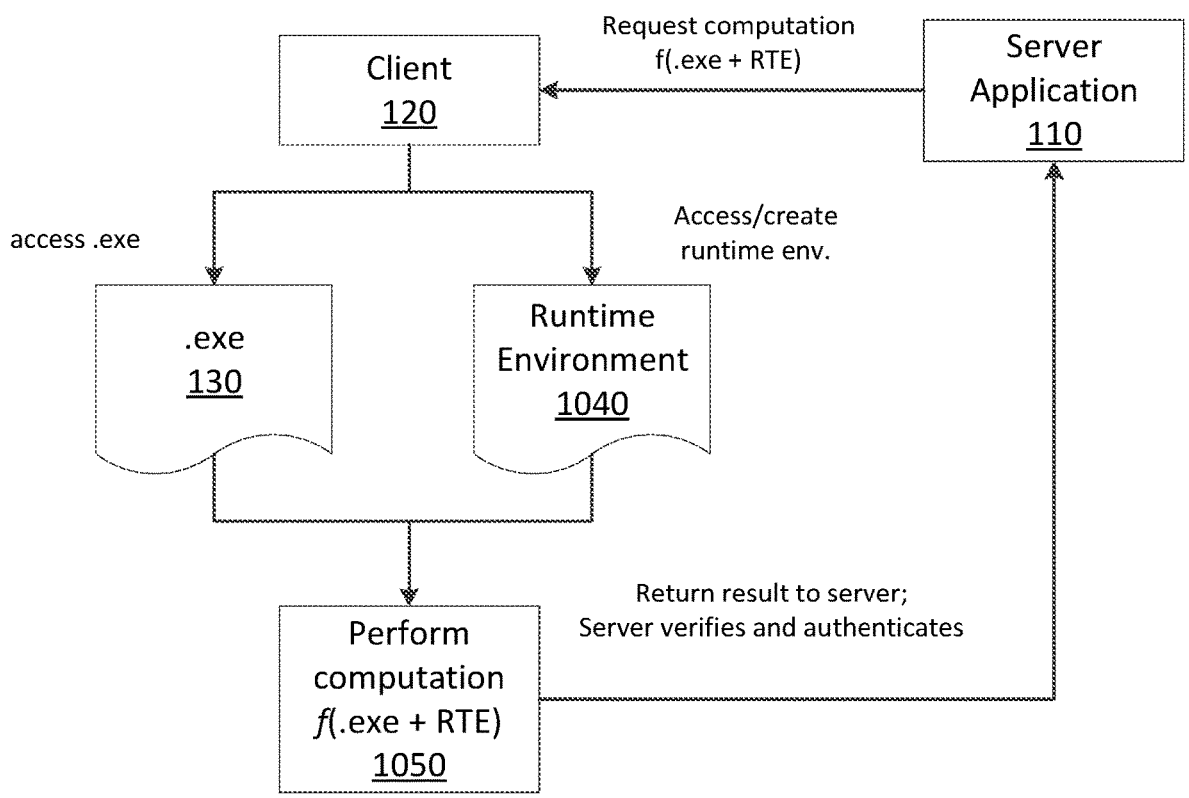
FIG. 10 is a block diagram illustrating an example method of authentication using a token comprising a computation based on a portion of the client application executable and a representation of the run-time environment, according to one embodiment.

FIG. 10 illustrates one example method of generating tokens using computations involving both the client application executable 130 and run-time environment information associated with the client application 120. An environment 1000 contains a server application 110, a client application 120, a client application executable 130, a run-time environment 1040, and a computation f(.exe+RTE) 1050.

In this example, the server application 110 requests a token. The request specifies the computation 1050 that involves both a portion of the client application executable 130 and a representation of the run-time environment 1040 of the client application. Again, as discussed above other resources may additionally or alternatively be used, either alone or alongside other factors. In this example, upon receipt of this request, the client application 120 accesses the client application executable 130 and extracts a copy of the specified portion as described in previous embodiments. In parallel, the client application 120 accesses or initializes its run-time environment 1040. In one embodiment of this method, the client application 120 produces a representation of the memory allocation state associated with the run-time environment 1040.

Next, the client application 120 inputs both the extracted portion of the client application executable 130 as well as the representation of its run-time environment 1040 into a computation as directed by the request from the server application 110. The client application 120 produces the computation result f(.exe+RTE) 1050, and transmits a token containing this result to the server application 110. The server application 110 receives the token and verifies the computation result as described in previous embodiments. Upon successful verification, the server application 110 authenticates the client application 120.

Figure 11:
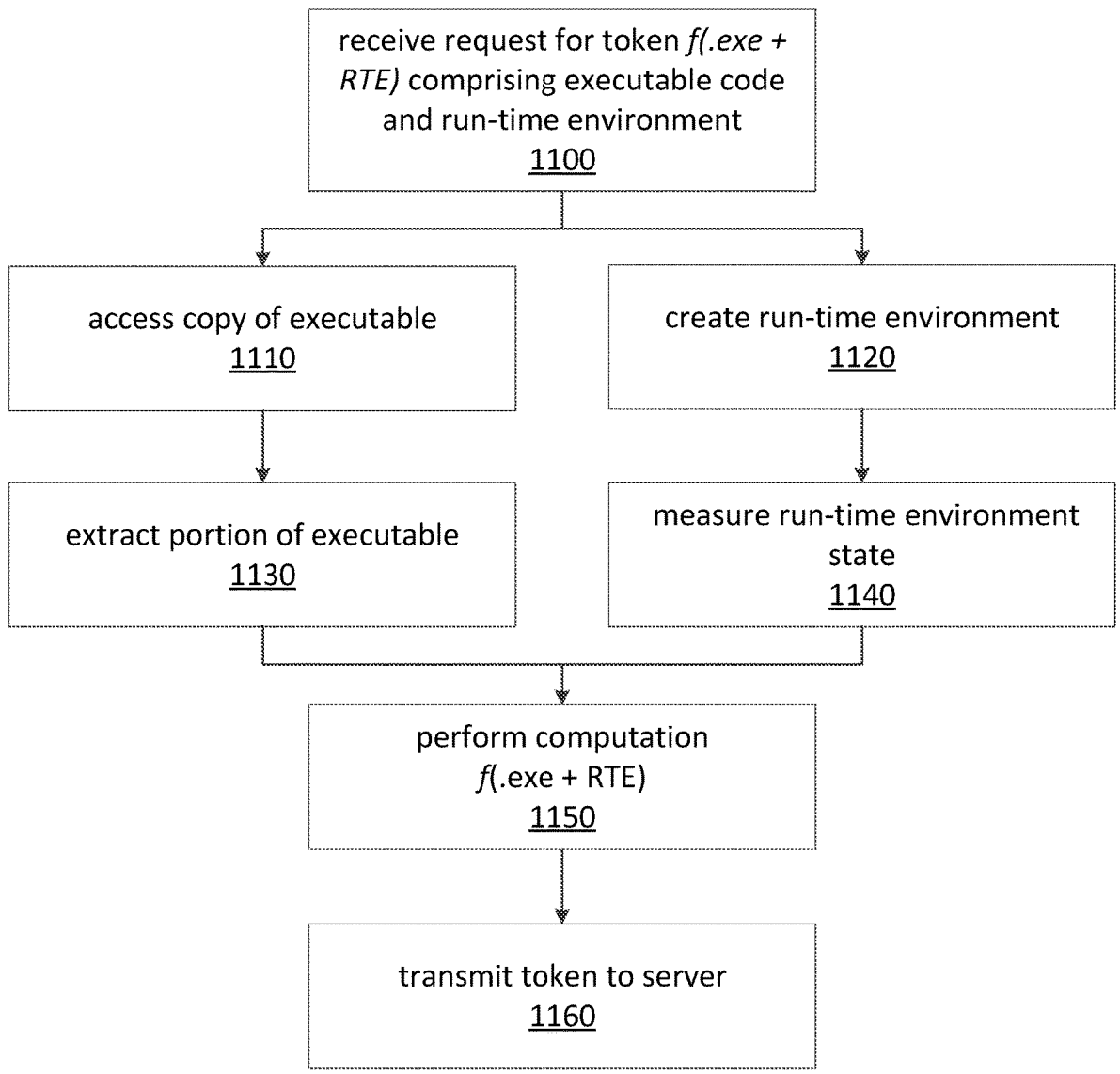
FIG. 11 is a flowchart illustrating an example method of authentication using a token comprised of a computation based on a portion of the client application executable and a representation of the run-time environment of the client application, according to one embodiment.

FIG. 11 is a flowchart illustrating the previously described method. The client application 120 receives 1100 a request for a token, the request specifying a computation f(.exe+RTE) comprising both a portion of the client application executable 130 as well as a representation of the run-time environment 1040. Upon receipt of this request, the client application 120 performs two action sequences in parallel. In one sequence, the client application 120 accesses 1110 the client application executable 130, and extracts 1130 a copy of the specified portion. In the other sequence, the client application 120 creates 1120 the run-time environment 1040, and produces 1140 a representation of the run-time environment 1040 in a manner specified by the server application 110. Next, having extracted a copy of the portion of the client application executable 130 and produced a representation of the run-time environment 1040, the client application 120 performs 1150 the specified computation 1050 f(.exe+RTE). Finally, the client application 120 transmits 1160 a token comprising the computation result 1050 to the server application 110.

Figure 12:
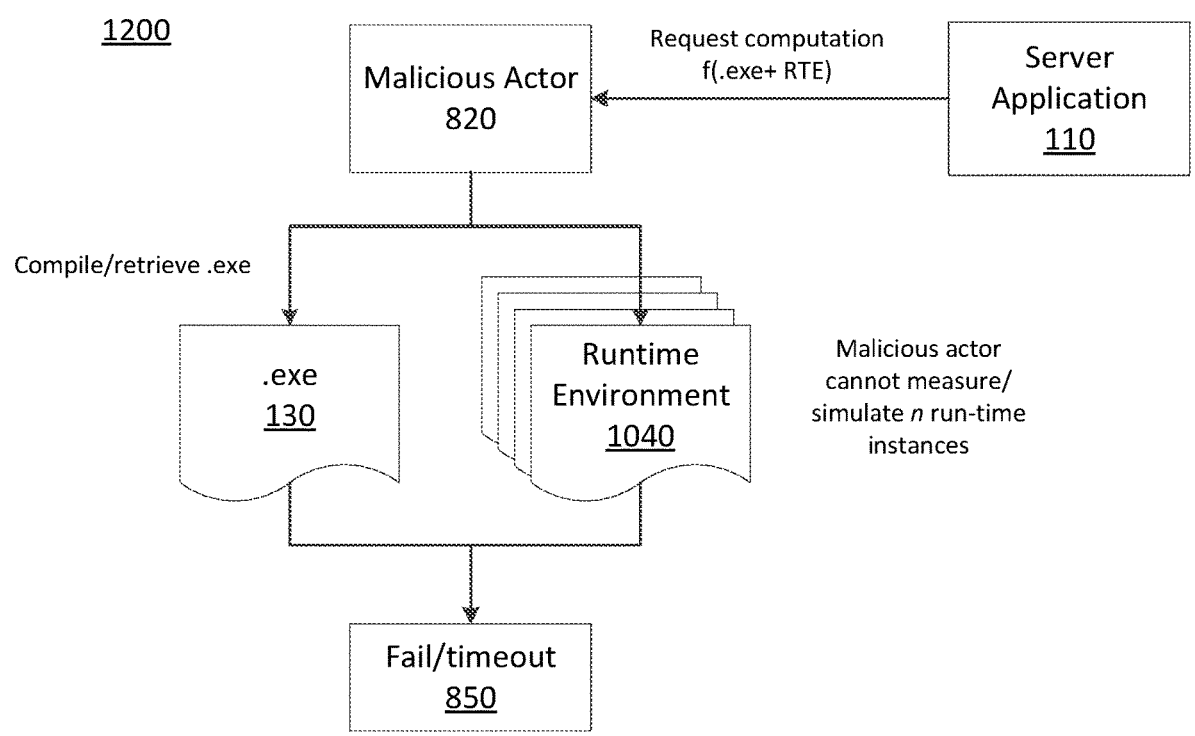
FIG. 12 is a block diagram illustrating an example method of denying authentication to a malicious actor using a token comprised of a computation based on a portion of a client application executable and a representation of the run-time environment of the client application, according to one embodiment.

FIG. 12 illustrates an intended outcome for a malicious actor, e.g. 820, attempting to perform the steps described above, according to the same example. An environment 1200 contains a server application 110, a malicious actor 820, a client application executable 130, n instances of the client application run-time environment 1040, and a terminal fail/time out state 850. A server application 120 requests a token. The request specifies a computation 1050 f(.exe+RTE) that involves both a portion of the legitimate client application executable 130 and a representation of the run-time environment 1040 of the legitimate client application 120. Upon receipt of this request, the malicious actor 820 accesses the client application executable 130 and extracts a copy of the specified portion as described in previous embodiments. In parallel, the malicious actor 820 attempts to measure or otherwise represent a portion of each of the n instances of the run-time environment 1040 of the client application 120. This is a time-consuming and resource-intensive step, and the malicious actor 820 is unable to perform it successfully. With the malicious actor 820 unable to respond, the authentication process enters 850 the fail/time out state.

Figure 13:
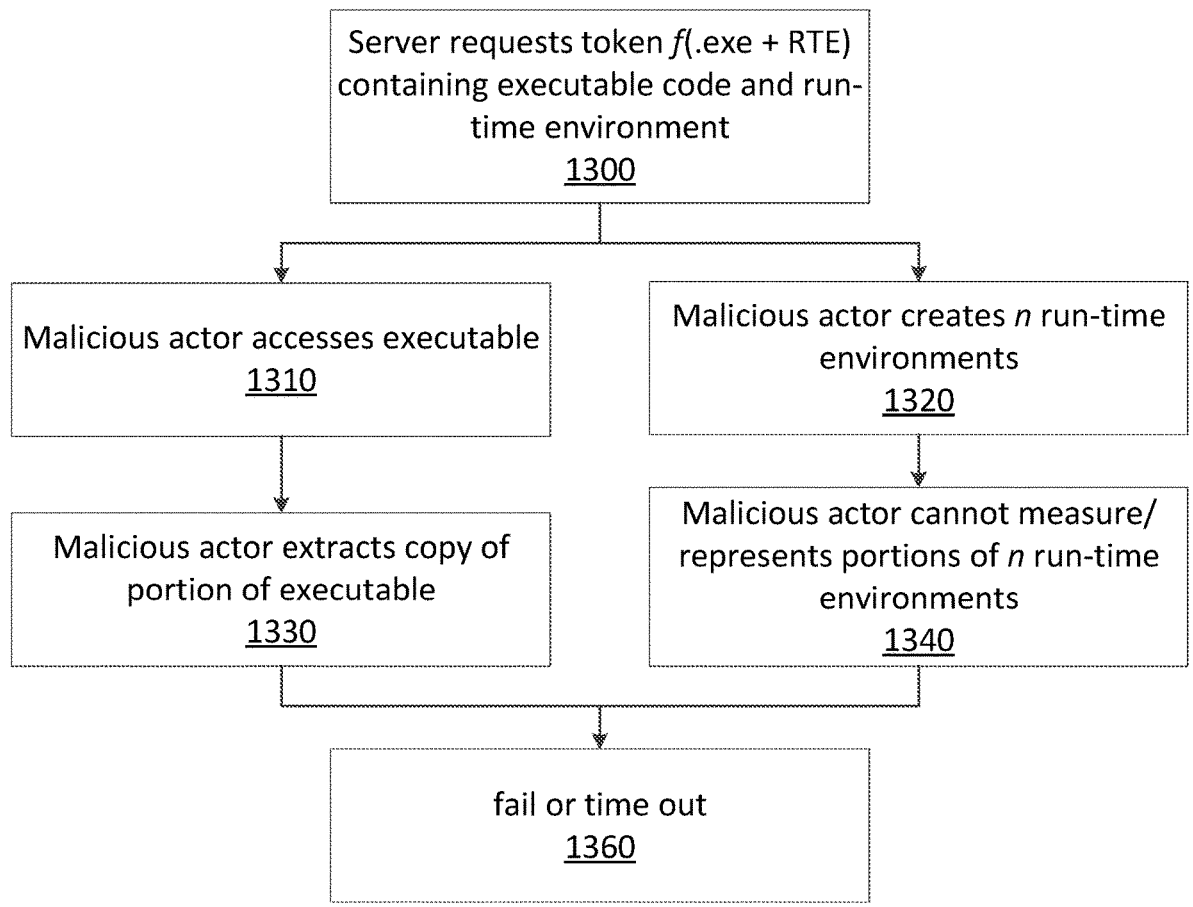
FIG. 13 is a flowchart illustrating an example method of denying authentication to a malicious actor using a token comprised of a computation based on a portion of the client application executable and a representation of the run-time environment, according to one embodiment.

FIG. 13 is a flowchart illustrating the above method. A server application 110 requests 1300 a token, the request specifying a computation f(.exe+RTE) comprising both a portion of the client application executable 130 as well as a representation of the run-time environment 1040 of the client application 120. In parallel, the malicious actor 820 creates 1320 n run-time environments 1040. However, the malicious actor 820 attempts 1340 to measure or otherwise represent a portion of each of then run-time environments 1040, but is unable to do so due to the significant computing resources required. With the malicious actor 820 unable to respond, the authentication process reaches 1360 a terminal fail/time out state 850.

Token Generation Using State Variables

In another embodiment, tokens may be created in such a way as to ensure continuity between successive authentication iterations. This "trail of breadcrumbs" approach adds a layer of difficulty to the authentication process by requiring that a client application. e.g. 120, maintains a state variable of some kind for use in authentication. The state variable may be related to a computation performed during the previous authentication iteration, and may be updated every time a new computation is performed. Further, the periodically-updated state variable may be obfuscated so as to make it very difficult for a malicious actor, e.g. 820, to identify without costly reverse-engineering of a client application executable, e.g. 130.

Figure 14:
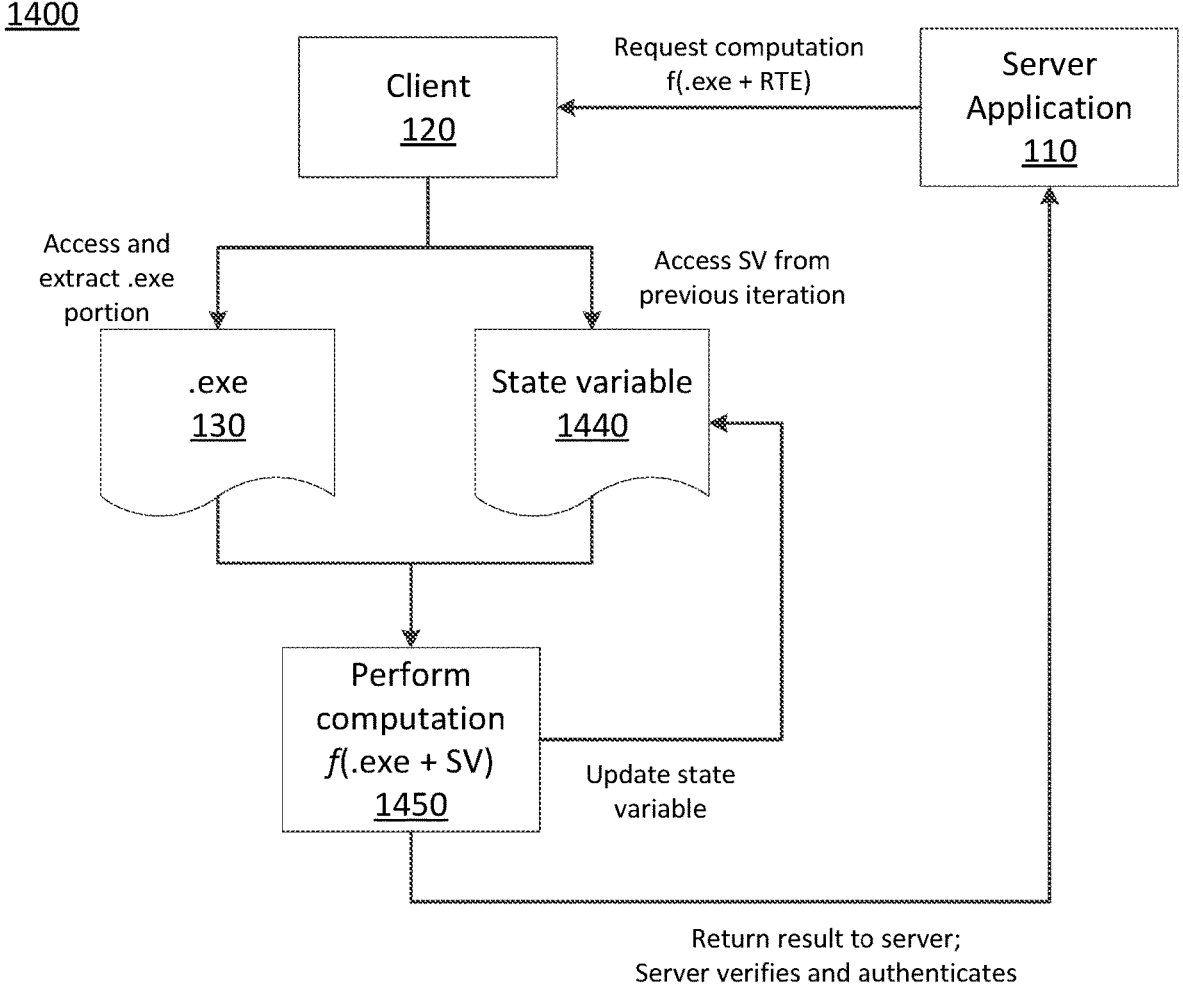
FIG. 14 is a block diagram illustrating an example method of authentication using a token comprised of a computation based on a portion of the client application executable and a state variable computed during a prior authentication iteration, according to one embodiment.

FIG. 14 illustrates the method of token generation using a state variable, according to one embodiment. Again, as discussed above other resources may additionally or alternatively be used, either alone or alongside other factors. In this example, an environment 1400 contains a server application 110, a client application 120, a client application executable 130, a state variable 1440, and a computation result f(.exe+SV) 1450. The server application 110 first requests a token, the request specifying a computation involving or based on a portion of the client application executable 130 as well as the state variable 1440. Upon receipt of the request, the client application 120 accesses the client application executable 130 and extracts the specified portion. In parallel, the client application 120 also accesses the state variable 1440. The client application 120 then performs the specified computation f(.exe+SV) 1450. After completing the computation, the client application 120 transmits a token containing the result to the server application 110. The server application 110 verifies the result, and upon successful verification authenticates the client application 120.

Figure 15:
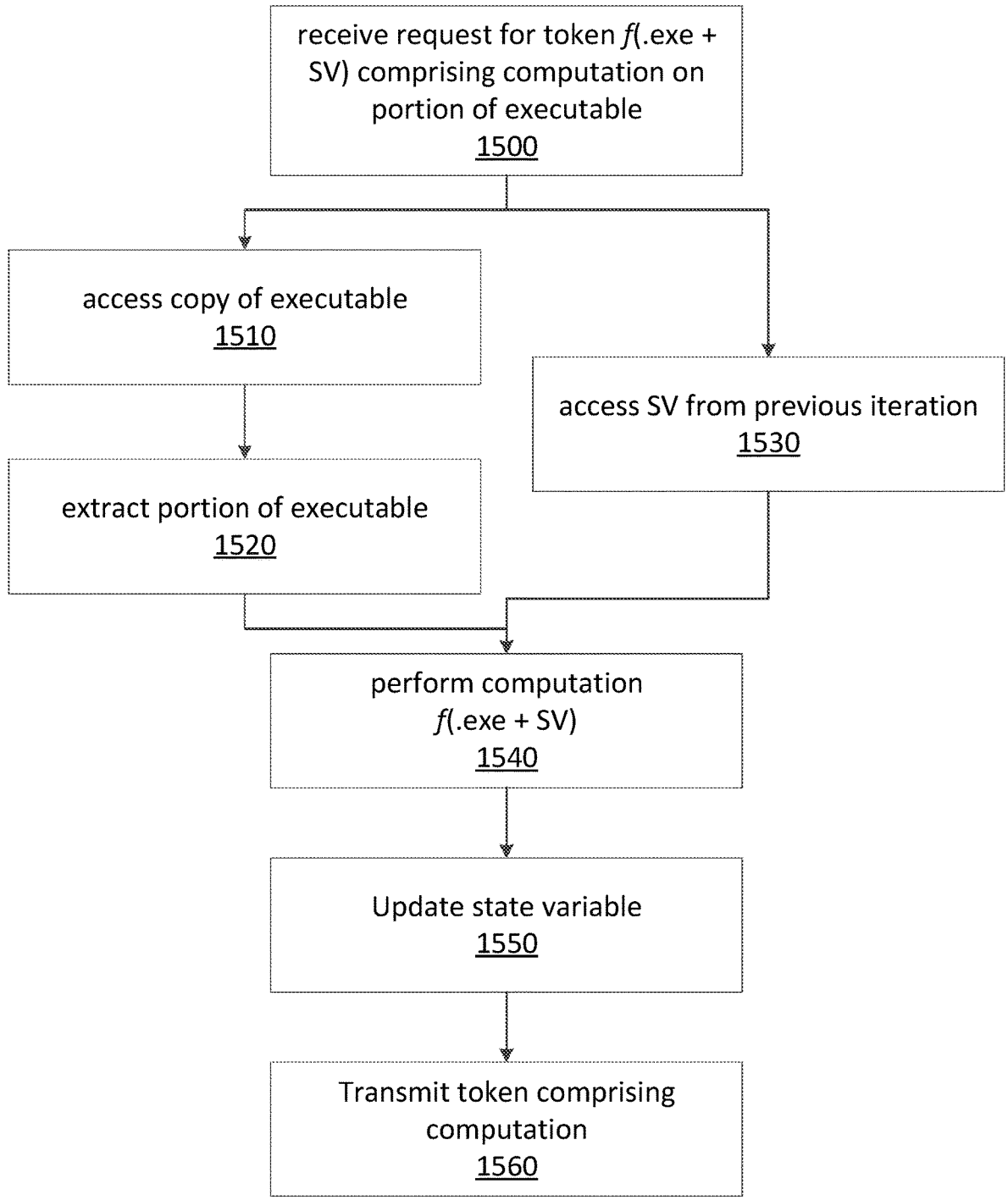
FIG. 15 is a flowchart illustrating an example method of authentication using a token comprised of a computation based on a portion of the client application executable and a state variable computed during a prior authentication iteration, according to one embodiment.

FIG. 15 is a flowchart illustrating the method described above, from the perspective of the client application 120. The client application 120 receives 1500 a request for a token. The request specifies a computation involving or based on a portion of the client application executable 130 as well as the state variable 1440. Upon receipt of the request, the client application 120 accesses 1510 the client application executable 130, and extracts 1520 the specified portion. In parallel, the client application 120 accesses 1530 the state variable 1440 computed during a previous authentication iteration. The client application 120 then performs 1540 the requested computation f(.exe+SV) 1450, and updates 1550 the state variable 1440 based on the computation 1450. Finally the client application 120 transmits 1560 a token comprising the computation 1450 to the server application 110.

Example Machine/Computing System Architecture

Figure 16:
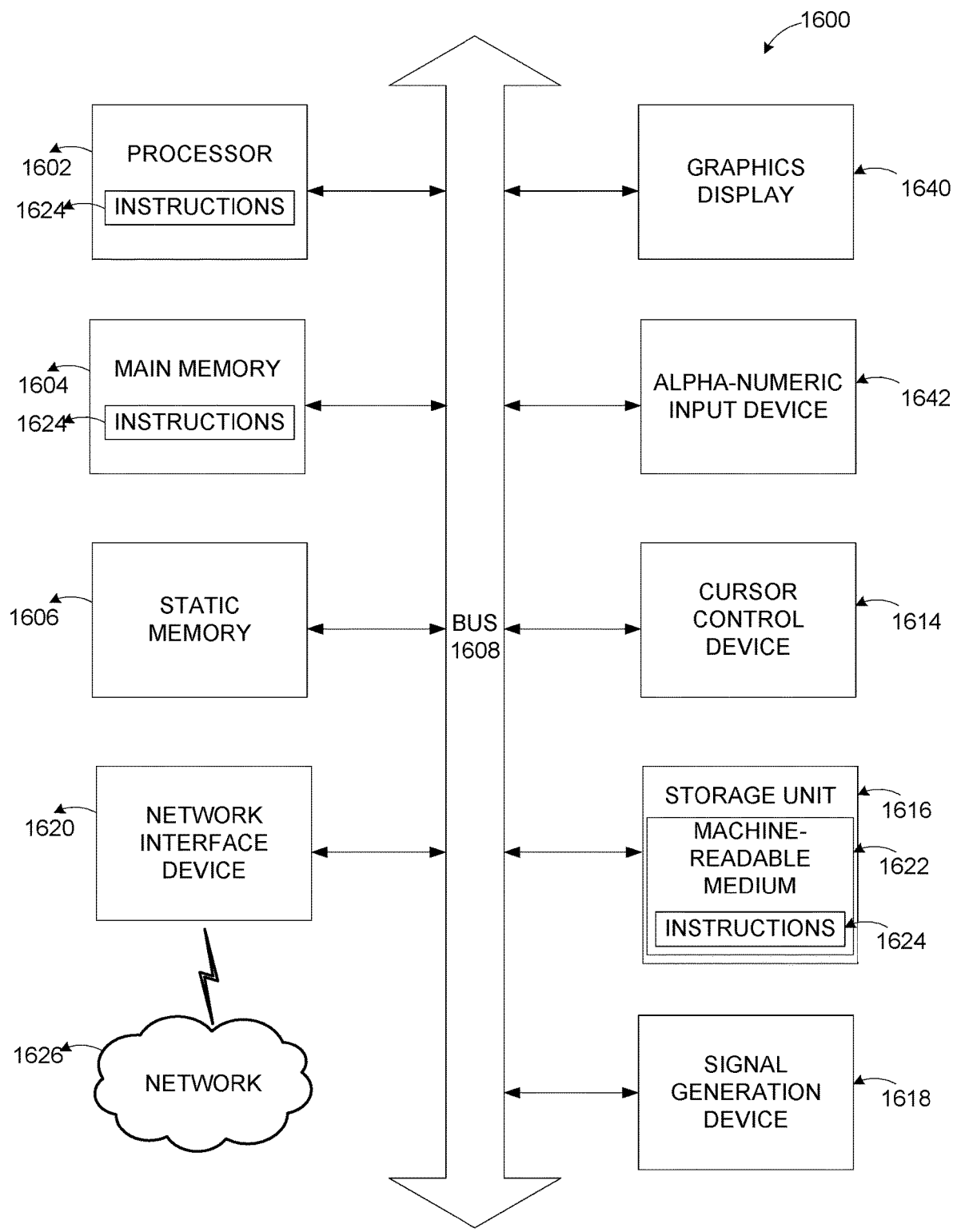
FIG. 16 is a block diagram illustrating components of an example machine able to read instructions from a machine-readable medium and execute them in a processor (or controller.

FIG. 16 is a block diagram illustrating components of an example machine (or device) able to read instructions from a machine-readable medium and execute them in a processor (or controller), such as by server executing the server application 130 or the client device 120 executing the client application 120 or executable 130. Specifically, FIG. 16 shows a diagrammatic representation of a machine in the example form of a computer system 1600. The computer system 1600 can be used to execute instructions 1624 (e.g., program code or software) for causing the machine to perform any one or more of the modules or methodologies (or processes) described herein, for example with respect to FIGS. 1 through 15. In an alternative embodiment, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an Internet of things (IoT) appliance, a network router, switch or bridge, or any machine capable of executing instructions 1624 (sequential or otherwise) that specify actions to be taken by that machine. Further, while only a single machine is illustrated, the term "machine" shall also be taken to include any collection of machines that individually or jointly execute instructions 1624 to perform any one or more of the methodologies discussed herein.

The example computer system 1600 includes one or more processing units (generally processor 1602). The processor 1602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 1600 also includes a main memory 1604. The computer system may include a storage unit 1616. The processor 1602, memory 1604 and the storage unit 1616 communicate via a bus 1608.

In addition, the computer system 1606 can include a static memory 1606, a display driver 1640 (e.g., to drive a plasma display panel (PDP), a liquid crystal display (LCD), or a projector). The computer system 1600 may also include alphanumeric input device 1642 (e.g., a keyboard), a cursor control device 1614 (e.g., a mouse, a trackball, a joystick, a motion sensor, or other pointing instrument), a signal generation device 1618 (e.g., a speaker), and a network interface device 1620, which also are configured to communicate via the bus 1608.

The storage unit 1616 includes a machine-readable medium 1622 on which is stored instructions 1624 (e.g., software) embodying any one or more of the methodologies or functions described herein. The instructions 1624 may also reside, completely or at least partially, within the main memory 1604 or within the processor 1602 (e.g., within a processor's cache memory) during execution thereof by the computer system 1600, the main memory 1604 and the processor 1602 also constituting machine-readable media. The instructions 1624 may be transmitted or received over a network 1626 via the network interface device 1620.

While the machine-readable medium 1622 is shown in an example embodiment to be a single medium, the term "machine-readable medium" should be taken to include a single medium or multiple media (e.g., a centralized or distributed database, or associated caches and servers) able to store the instructions 1624. The term "machine-readable medium" shall also be taken to include any medium that is capable of storing instructions 1624 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

Current methods of authentication involve the use of static tokens that are easily created, stolen, or transferred by malicious actors attempting to gain illegitimate access to a server application. The previously disclosed configurations improve authentication security by increasing the complexity of authentication token generation such that malicious actors must perform more steps to prepare a token, thereby expending more time or computing resources than is feasible. Embodiments include incorporation of resources of the client application, or a computation thereof. Some computations may involve a cryptographic hash function, the output and of which cannot be easily analyzed to determine the input. In some embodiments, other digital information factors, such as time and date, and numerical properties thereof, may modify generated tokens in a way that is prohibitively difficult to reverse-engineer and reproduce. These numerical properties may include primeness and/or factorability, among others. Additionally, incorporation of a state variable or a representation of a run-time environment of a client application are disclosed which further increase the complexity of token generation. These complications in particular may limit the ability of a malicious actor to create multiple instances of a client application, thereby discouraging one common avenue of attacks on server infrastructure. Generally, the size of the token itself is further prohibitive of token deduction or generation.

In other embodiments, other non-executable resources that are packaged with the client executable could also be used as a basis for token generation. These non-executable resources include but are not limited to: translation string files, sound files, icons, images, and other graphics. Additionally, these non-executable resources could be relied on as supplementary information factors that modify or obscure previously-described token generation algorithms that incorporate executable code.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, applications, modules, or mechanisms, for example, as illustrated in FIGS. 1, 2, 3, 6, 8, 10, 12, and 14. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein (e.g., as described with FIGS. 4, 5, 7, 9, 11, 13, and 15) may be performed, at least partially, by one or more processors, e.g., processor 1602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors, e.g., processor 1602, may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., memory 1604). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for delegating authentication of an untrusted application executing on a client device through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The figures and the preceding description relate to embodiments by way of illustration only. It should be noted that from the preceding discussion, alternative embodiments of the structures and methods disclosed herein will be readily recognized as viable alternatives that may be employed without departing from the principles of what is claimed.

Reference is made in detail to several embodiments, examples of which are illustrated in the accompanying figures. It is noted that wherever practicable similar or like reference numbers are used in the figures and may indicate similar or like functionality. The figures depict embodiments of the disclosed system (or method) for purposes of illustration only. One skilled in the art will readily recognize from the preceding description that alternative embodiments of the structures and methods illustrated herein may be employed without departing from the principles described herein.

What is claimed is:

1. A method comprising:
   receiving, by a client application executing on a client device, a request from a server for a token, wherein the request specifies a computation to be performed to generate the token based on a portion of a client application resource on the client device and a state variable, wherein the state variable was computed by the client application during a previous authentication iteration;
   accessing, by the client application, the state variable and the specified portion of the client application resource on the client device, wherein the content of the client application resource is accessible to both the client application and the server, and that the server is aware that the specified portion of the client application resource is accessible to the client application in response to the request;
   extracting, by the client application, a copy of the specified portion of the client application resource;
   using the extracted copy of the specified portion of the client application resource and the state variable to perform the computation to generate the token; and
   transmitting, by the client application, the token to the server for authentication at the server using the token.

2. The method of claim 1, wherein the token requested corresponds to a random portion of the client application resource.

3. The method of claim 1, wherein the specified portion of the client application resource is selected by the server based on a time metric such that requests at different times will use different portions of the client application resource based on a time at which the request is received.

4. The method of claim 1, wherein the computation to be performed to generate the token includes applying a function to the portion of the client application resource and the state variable.

5. The method of claim 4, wherein the computation on the portion of the client application resource comprises one or more cryptographic hash functions.

6. The method of claim 1, wherein the token requested corresponds to a portion of executable code of the client application.

7. The method of claim 1, wherein the token requested by the server is further based at least in part upon a representation of a run-time environment of the client application.

8. The method of claim 7, wherein the representation of the run-time environment of the client application includes information about a memory allocation scheme of the client application.

9. A method comprising:
   identifying a portion of a client application resource that is accessible to both the client application and the server, and that the server is aware that the portion of the client application resource is accessible to the client application, wherein a copy of the identified portion of the client application resource file is accessible by the server from a database;
   transmitting, from a server to a client application executing on a client device, the request for the token, wherein the request specifies a computation based on the portion of the client application resource to use in generating the token, the portion of the client application resource comprising a code portion of the client application executable, and based on a state variable computed during a previous authentication iteration;
   receiving, from the client application, the token;
   comparing the token with counterpart content based on the corresponding portion of the client application resource stored in the database; and
   authenticating the client application in response to a verification between the token and the portion of the client application resource stored in the database.

10. The method of claim 9, wherein the request for the token includes a function to apply to the specified portion of the client application resource and the state variable, and wherein comparing the token with the counterpart content includes applying the same function to the corresponding portion of the client application resource stored in the database and the state variable obtained during the previous authentication iteration.

11. The method of claim 9, wherein the identified portion of the client application resource is a pseudo-randomly selected portion of executable code of the client application.

12. A non-transitory computer readable storage medium comprising instructions, the instructions when executed by a processor causing the processor to:
   receive, by a client application executing on a client device, a request from a server for a token, wherein the request specifies a computation to be performed to generate the token based on a portion of a client application resource on the client device and a state variable, wherein the state variable was computed by the client application during a previous authentication iteration;

access, by the client application, the state variable and the specified portion of the client application resource on the client device, wherein the content of the client application resource is accessible to both the client application and the server, and that the server is aware that the specified portion of the client application resource is accessible to the client application in response to the request;

extract, by the client application, a copy of the specified portion of the client application resource;

using the extracted copy of the specified portion of the client application resource and the state variable to perform the computation to generate the token; and transmit, by the client application, the token to the server for authentication at the server using the token.

13. The non-transitory computer readable storage medium of claim 12, wherein the token requested corresponds to a random portion of the client application resource.

14. The non-transitory computer readable storage medium of claim 12, wherein the specified portion of the client application resource is selected by the server based on a time metric such that requests at different times will use different portions of the client application resource based on a time at which the request is received.

15. The non-transitory computer readable storage medium of claim 12, wherein the computation to be performed to generate the token includes applying a function to the portion of the client application resource and the state variable.

16. The non-transitory computer readable storage medium of claim 12, wherein the computation on the portion of the client application resource comprises one or more cryptographic hash functions.

17. The non-transitory computer readable storage medium of claim 12, wherein the token requested corresponds to a portion of executable code of the client application.

18. The non-transitory computer readable storage medium of claim 12, wherein the token requested by the server is further based at least in part upon a representation of a run-time environment of the client application.

19. The non-transitory computer readable storage medium of claim 18, wherein the representation of the run-time environment of the client application includes information about a memory allocation scheme of the client application.

20. A non-transitory computer readable storage medium comprising instructions, the instructions when executed by a processor causing the processor to:

identifying a portion of a client application resource that is accessible to both the client application and the server, and that the server is aware that the portion of the client application resource is accessible to the client application, wherein a copy of the identified portion of the client application resource file is accessible by the server from a database;

transmitting, from a server to a client application executing on a client device, the request for the token, wherein the request specifies a computation based on the portion of the client application resource to use in generating the token, the portion of the client application resource comprising a code portion of the client application executable, and based on a state variable computed during a previous authentication iteration;

receiving, from the client application, the token;

comparing the token with counterpart content based on the corresponding portion of the client application resource stored in the database; and authenticating the client application in response to a verification between the token and the portion of the client application resource stored in the database.

21. The non-transitory computer readable storage medium of claim 20, wherein the request for the token includes a function to apply to the specified portion of the client application resource and the state variable, and wherein comparing the token with the counterpart content includes applying the same function to the corresponding portion of the client application resource stored in the database and the state variable obtained during the previous authentication iteration.

22. The non-transitory computer readable storage medium of claim 20, wherein the identified portion of the client application resource is a pseudo-randomly selected portion of executable code of the client application.

23. A system comprising:

one or more computers having one or more processors and one or more computer readable storage media comprising instructions that when executed by the one or more computers causes the one or more computers to perform operations comprising:

receiving, by a client application executing on a client device, a request from a server for a token, wherein the request specifies a computation to be performed to generate the token based on portion of a client application resource on the client device and a state variable, wherein the state variable was computed by the client application during a previous authentication iteration;

accessing, by the client application, the state variable and the specified portion of the client application resource on the client device, wherein the content of the client application resource is accessible to both the client application and the server, and that the server is aware that the specified portion of the client application resource is accessible to the client application in response to the request;

extracting, by the client application, a copy of the specified portion of the client application resource;

using the extracted copy of the specified portion of the client application resource and the state variable to perform the computation to generate the token; and transmitting, by the client application, the token to the server for authentication at the server using the token.

24. The system of claim 23, wherein the token requested corresponds to a random portion of the client application resource.

25. The system of claim 23, wherein the specified portion of the client application resource is selected by the server based on a time metric such that requests at different times will use different portions of the client application resource based on a time at which the request is received.

26. The system of claim 23, wherein the computation to be performed to generate the token includes applying a function to the portion of the client application resource and the state variable.

27. The system of claim 26, wherein the computation on the portion of the client application resource comprises one or more cryptographic hash functions.

28. The system of claim 23, wherein the token requested corresponds to a portion of executable code of the client application.

29. The system of claim 23, wherein the token requested by the server is further based at least in part upon a representation of a run-time environment of the client application.

30. The system of claim 29, wherein the representation of the run-time environment of the client application includes information about a memory allocation scheme of the client application.

31. A system comprising:
one or more computers having one or more processors and one or more computer readable storage media comprising instructions that when executed by the one or more computers causes the one or more computers to perform operations comprising:
identifying a portion of a client application resource that is accessible to both the client application and the server, and that the server is aware that the portion of the client application resource is accessible to the client application, wherein a copy of the identified portion of the client application resource file is accessible by the server from a database;
transmitting, from a server to a client application executing on a client device, the request for the token, wherein the request specifies a computation based on the portion of the client application resource to use in generating the token, the portion of the client application resource comprising a code portion of the client application executable, and based on a state variable computed during a previous authentication iteration;
receiving, from the client application, the token;
comparing the token with counterpart content based on the corresponding portion of the client application resource stored in the database; and
authenticating the client application in response to a verification between the token and the portion of the client application resource stored in the database.

32. The system of claim 31, wherein the request for the token includes a function to apply to the specified portion of the client application resource and the state variable, and wherein comparing the token with the counterpart content includes applying the same function to the corresponding portion of the client application resource stored in the database and the state variable obtained during the previous authentication iteration.

33. The system of claim 31, wherein the identified portion of the client application resource is a pseudo-randomly selected portion of executable code of the client application.

* * * * *